Figure 1:
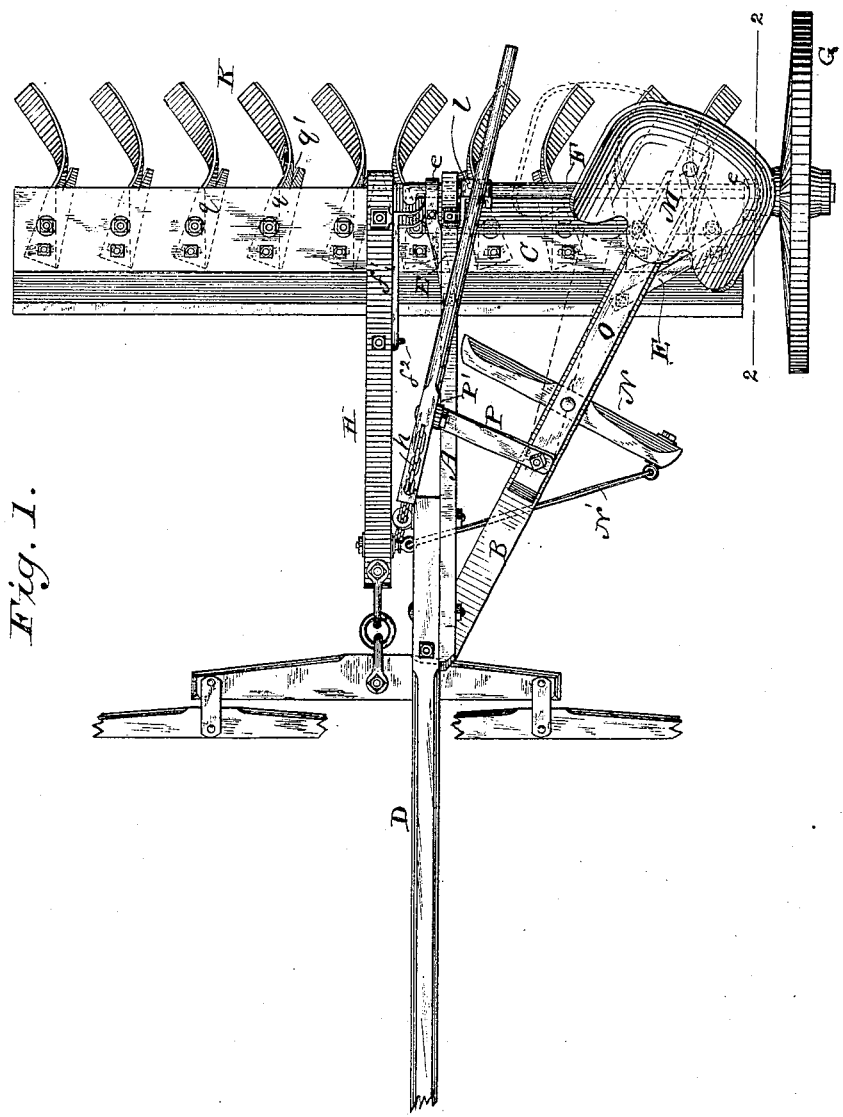

(No Model.)  2 Sheets—Sheet 1.

F. NISHWITZ.
HARROW.

No. 262,308. Patented Aug. 8, 1882.

WITNESSES
Wm A. Skinkle
Wm Tanner

INVENTOR
Frederick Nishwitz

By his Attorneys
Baldwin, Hopkins & Peyton (No Model.)
2 Sheets—Sheet 2.
F. NISHWITZ.
HARROW.
No. 262,308. Patented Aug. 8, 1882.
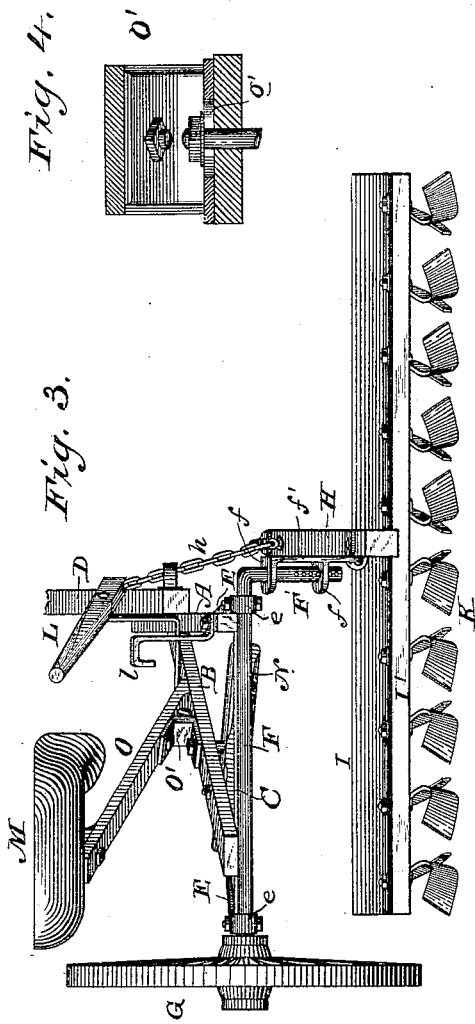
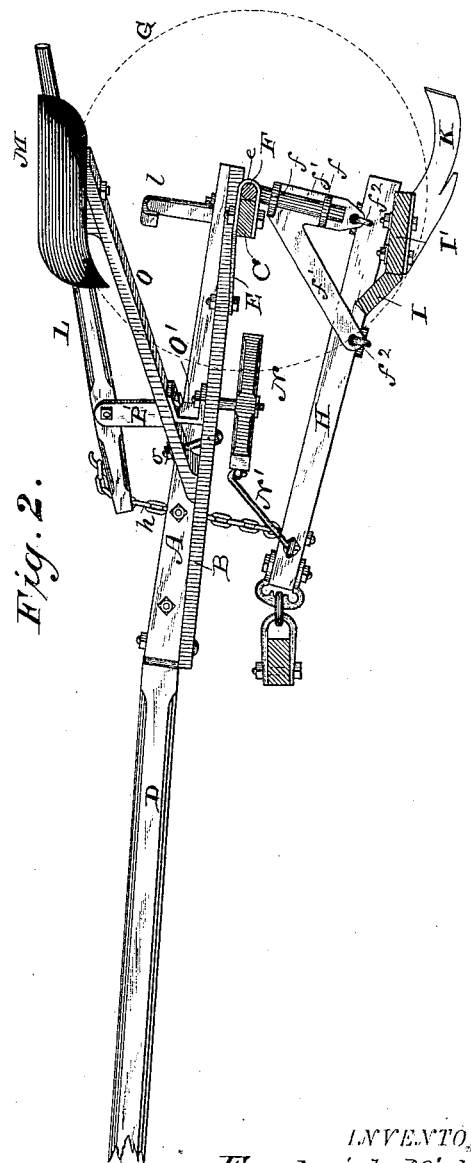
WITNESSES
Wm A. Skinkle
Wm J. Tanner
INVENTOR
Frederick Nishwitz
By his Attorneys
Baldwin, Hopkins, & Peyton

UNITED STATES PATENT OFFICE.

FREDERICK NISHWITZ, OF MILLINGTON, NEW JERSEY.

HARROW.

SPECIFICATION forming part of Letters Patent No. 262,308, dated August 8, 1882.

Application filed January 23, 1882. (No model.)

*To all whom it may concern:*

Be it known that I, FREDERICK NISHWITZ, of Millington, in the county of Morris and State of New Jersey, have invented certain new and useful Improvements in Harrows, of which the following is a specification.

My invention consists in a one-wheel sulky-harrow in which one side or end of the sulky frame or axle is supported by a carrying-wheel and the other by the harrow proper.

My invention also consists in certain organizations of apparatus in such a machine, whereby the harrow can be vertically adjusted or rocked so as to vary its relation to the ground, can be horizontally adjusted or swung to change the angle of the harrow relatively to the line of draft, is free to rock transversely to the line of draft to conform to irregularities and undulations of the ground, and by which the weight of the driver may be thrown more or less onto the harrow, as may be desired.

My invention also consists in certain improvements in the harrowing devices or implements for treating the soil.

The purpose of the organization thus briefly indicated is to produce a compact, strong, and light harrow which will treat the earth in the most perfect manner, which can be worked in all kinds of soil, and in which the relation of the harrow to the surface traversed can be readily varied at the will of the driver from his seat on the machine.

The machine shown in the drawings and described in detail hereinafter is provided with a rigid pole or tongue. I consider this the most practical and efficient manner of constructing it, as the rigid pole serves as a brace or support from which the harrow may be rocked vertically or swung laterally. It is not my purpose, however, to limit myself in every instance to a rigid pole, as it is possible the pole may also be hinged. Thus, if the pole be hinged laterally, the carrying-wheel may hold the frame sufficiently rigid to permit of the harrow being swung laterally, and if the pole be hinged vertically the driver's weight might be arranged in such relation to the harrow as to maintain the harrow in the proper desired relation to the soil.

In the accompanying drawings, Figure 1 is a plan view; Fig. 2, a section on the line 2 2 of Fig. 1; Fig. 3, a rear elevation, and Fig. 4 a detail view of the V-shaped brace or seat-support.

The sulky-frame is triangular in shape, and is composed of the bars A B C, which are properly bolted together. The pole or tongue D is parallel with and rigidly bolted to the bar A, and is also bolted to the bar B, as clearly shown. The cross bar or beam C is braced to the bars A and B by straps E E. Prolongations of these straps form eyes or bearings $e\,e$ at the rear of the cross-bar C, in which the axle F of the machine loosely turns. The single carrying or sulky wheel G supports and turns loosely upon one end of this axle and the harrow-supports, and is pivotally connected with the other end in the following manner: The axle is bent at right angles, so as to form a straight downwardly-projecting arm, F', which passes through eyes or bearings $f\,f$ in an angular or two-armed bearing or supporting plate, $f'$, both arms of which are hinged or pivotally connected at $f^2\,f^2$ with the draft-beam H of the harrow. The arm F' of the axle is provided with a series of holes in which a pin may be inserted to hold the harrow at different heights thereon. This construction freely permits the following movements: first, the forward end of the draft-beam H of the harrow may be raised and lowered so as to rock the harrow and vary its relation to the surface traversed, the rocking of the axle F in its bearings allowing this movement; second, the harrow may swivel horizontally or be swung laterally to vary its relation to the line of draft, the bearings $f\,f$ allowing this movement; and, third, the harrow can rock transversely to the line of draft on the hinge-connections $f^2\,f^2$, so as to readily conform to the undulations and irregularities of the ground.

The harrow shown in the drawings consists of the draft-beam H, to which is secured at right angles an upwardly-inclined leveler-bar or clod-crusher, I. The gang-bar I', carrying the harrowing devices K, is secured to the draft-beam immediately in the rear of the leveler, and the two may be securely braced and held together by suitable angle-irons. The harrowing devices or implements will be fully described hereinafter.

The draft-beam H of the harrow is raised and lowered by a hand-lever, L, pivoted on the frame within reach of the driver from his seat, M, and having its end connected with the beam H by a lifting-chain, $h$. The beam may be held in its elevated position by a hook or catch, $l$, on the frame, which engages with the lever L. Instead of this arrangement, which holds the lever in one position only, the ordinary rack and pawl may be employed, so that the lever may be held at any desired point.

The harrow is swung laterally or longitudinally by a rod or link, N', which extends from the end of the beam H to one end of a double foot-lever, N, pivoted on the bar B in proper relation to the driver's seat. By this means the driver may from his seat on the machine swing the harrow either to the right or left of the line of draft, as may be desired, and by bearing on the lever may hold the harrow at any desired angle.

The driver's seat is mounted upon a standard, O, the forward end of which is pivoted upon the frame-bar B at $o$, so as to permit the standard to be adjusted laterally. A brace-bar or strap, P, extends from the end of the seat-standard to the bar A, and is turned up vertically so as to form the upright P', to which the hand-lever L is pivoted. A V-shaped brace or support, O', is placed between the seat-standard and frame-bar, in rear of the pivot of the former, so as to firmly support the standard. The upper arm or plate of this brace or support is securely and rigidly bolted to the seat-standard, while the lower plate resting on the frame-bar B is provided with an arc-shaped slot, $o'$, of which the pivot of the seat-standard is the center, and is held in any desired position by a set-screw or bolt.

It will be seen that the seat-standard may be swung or adjusted laterally in order to throw the weight of the driver more or less upon the harrow, thus adapting it for use in all kinds of soil, both dry, hard, and light and wet and heavy soil.

The whiffletree or draft attachment is connected directly to the draft-beam H of the harrow.

The carrying-wheel and the pole or tongue brace and steady the machine against the movements and adjustments herein mentioned, and as a consequence the machine will move steadily over the field without being affected by the variations of the relation of the harrow to the soil.

In traversing the field the leveler crushes down and breaks up all clods or irregularities and the harrowing devices cut up and scarify the soil, leaving it in a smooth, regular condition.

The improved harrowing or earth turning implements which I employ are clearly shown in the drawings. They are formed of sheet metal, preferably of steel, which is cut into suitable blanks and shaped as follows: The blank is crimped or turned at right angles at the end to be secured to the gang-bar on the inclined line $q$, so as to leave a flat triangular-shaped portion, through which the bolts that secure the tooth to the gang-bar pass. This crimping may, however, be omitted, and instead of a flat surface of attachment being provided, the teeth may be held in grooves or cuts in the gang-bar by any suitable fastening device. From this point the tooth inclines backward and downward, and is split at $q'$, the cutting-edge of the upper or main portion trailing or dragging, as it were, and curving downward and upward, as clearly shown in Fig. 2, and also outward to one side of the line of draft, while the smaller, shorter, and lower spur or portion inclines downward, and is curved from the line of draft in the opposite direction to that of the larger portion of the tooth. The shape of the teeth will be clear from the drawings, which accurately represent them. These teeth or implements are shown as arranged in two series on opposite sides of the line of draft, the main portion of the teeth in one series being curved reversely relatively to the line of draft to those in the other series. The teeth may, however, be arranged in a single series curved in a uniform direction without affecting the straight running of the machine, as the pressures of the upper and lower portions of the teeth in opposite directions upon the soil compensate each other and cause the harrow to move in a straight line. It is therefore entirely practicable to arrange the teeth in any desired manner without impairing the capacity and work of the machine. The teeth have been described somewhat in detail, and I desire to state that their essential feature consists in the two reversely-curved trailing or dragging portions—that is, the upper or main portion curved in one direction relatively to the line of draft and the lower or smaller spur or portion curved in the opposite direction.

I am aware of the patents granted F. R. Willson, September 24, 1867, and June 16, 1868, respectively numbered 69,290 and 79,042, and showing substantially the same form of tooth. The tooth shown in these patents is formed of a sheet of metal which projects downward from the frame of the cultivator with a very slight backward inclination, and is split at or about the middle, so as to form two cutters, which are bent or curved out on opposite sides. Each of the cutters is somewhat rectangular in general shape, and has a substantially-straight cutting-edge. The difference between my improved trailing harrow-teeth and the upright tooth of Willson is marked, notwithstanding they are both formed from a blank which is split and turned in reverse directions. I therefore limit myself to the obvious distinction between my invention and that shown in Willson's patents.

The harrow herein described and illustrated in the drawings is well adapted to be organized with the other portions of the machine described; but, so far as the broad feature of my invention is concerned, I do not wish to limit myself to this special form of harrow, or to any one form, as it will be obvious that harrows of different construction may be used in the improved sulky-machine herein described.

My improved machine is very compact, can be handled with promptness and facility to meet various requirements in the field, and is light, strong, and durable.

I am aware that sulky-plows in which a single carrying-wheel at one side and the plow at the other support the frame are old; and I am also aware that in such machines the plow has been capable of being rocked vertically and swung laterally. I am also aware that a sulky-plow having a single carrying-wheel and a laterally-adjustable seat is old. My improved harrow herein described is, however, a very different machine, in operation, effect, and organization.

I am also aware that a cultivator consisting of a frame or axle supported at one side by a single carrying-wheel and at the other side by a cultivator, and having an ordinary short draft-bar and guiding-handles, is old, and I therefore make no claim to such an organization.

I claim as my invention—

1. The combination of a pole or tongue, a frame or axle to which the tongue is connected, a carrying-wheel which supports one side of the frame, a harrow which supports the other, and a draft-connection on the harrow-beam, substantially as set forth.

2. The combination of a frame, a carrying-wheel supporting one side of the frame, and a harrow supporting the other, the harrow being connected with the side or end of the frame at or about its middle, and having harrowing teeth or implements arranged in a gang normally substantially parallel with the axle of the machine, as set forth.

3. The combination of a frame, a pole attached thereto, a carrying-wheel at one side of the frame, a harrow at the other, a pivotal connection between the harrow and frame which permits the harrow to rock vertically in line with the draft, and a lever for raising and lowering or rocking the harrow-beam relatively to the frame, substantially as set forth.

4. The combination of a frame, a pole or tongue attached thereto, a carrying-wheel at one side of the frame, a harrow at the other, and a hinge-connection between the frame and harrow, which permits the latter to rock freely transversely to the line of draft to conform to undulations of the ground when the machine is in operation, substantially as set forth.

5. The combination of a pole or tongue, a frame, a carrying-wheel at one side of the frame, a harrow at the other, a pivotal connection between the frame and harrow which permits the latter to rock vertically in line with the draft, a lever for rocking it, and a hinge-connection which permits the harrow to rock transversely to the line of draft to conform to undulations of the ground, substantially as set forth.

6. The combination of the pole or tongue, a sulky-frame, a carrying-wheel which supports one side of the frame or axle of the machine, a harrow which supports the other, a seat on the frame, and mechanism for adjusting the seat laterally to bring the weight of the driver more or less on the harrow, substantially as set forth.

7. The combination of the frame, the axle rocking in bearings on the frame, the carrying-wheel at one end of the axle, the downwardly-projecting arm at the other, the bearing or supporting plate in which said arm has its bearing, and the hinge-connection between the plate and harrow, substantially as set forth.

8. The trailing or dragging harrow-tooth herein described, having the two cutters or teeth, the trailing upper or main one, which extends downwardly and backwardly and is curved outwardly from the line of draft, and the trailing shorter spur or cutter, which also extends downwardly and backwardly and is curved outwardly from the line of draft reversely to the other portion of the tooth.

In testimony whereof I have hereunto subscribed my name this 18th day of January, 1882.

FREDERICK NISHWITZ.

Witnesses:
JAMES R. RUNYON,
JAMES A. BAKER.